June 23, 1964  L. B. WYCKOFF, JR  3,137,948
TEACHING MACHINES
Filed Aug. 17, 1960  2 Sheets-Sheet 1
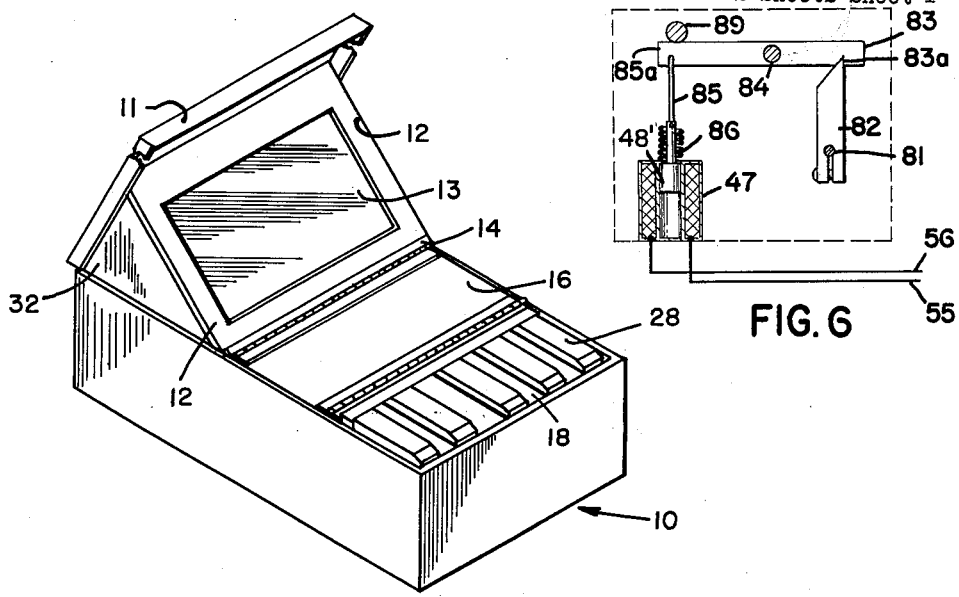
FIG. 1
FIG. 6
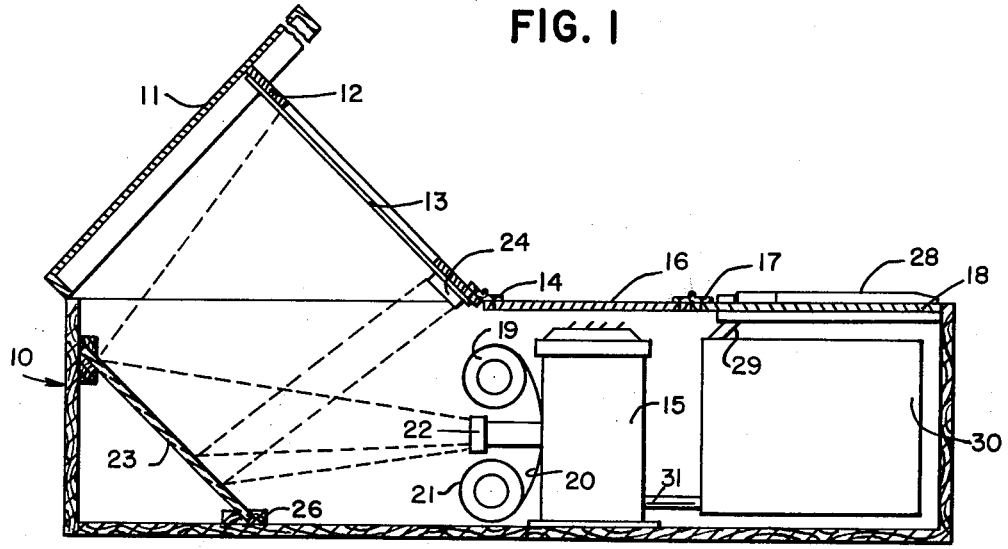
FIG. 2
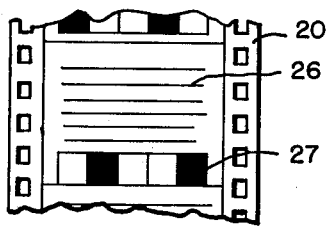
FIG. 3
INVENTOR.
L. B. WYCKOFF, JR.
BY Eugene E. Stevens
Raymond H. Stevens
His Attorneys June 23, 1964    L. B. WYCKOFF, JR    3,137,948
TEACHING MACHINES Filed Aug. 17, 1960    2 Sheets-Sheet 2

INVENTOR.
L. B. Wyckoff, Jr.
BY Eugene E. Stevens
Raymond H. Stevens
His Attorneys United States Patent Office 3,137,948
Patented June 23, 1964

3,137,948
TEACHING MACHINES
Lewis Benjamin Wyckoff, Jr., Atlanta, Ga., assignor to Teaching Machines, Inc., a corporation of Pennsylvania
Filed Aug. 17, 1960, Ser. No. 50,230
2 Claims. (Cl. 35—9)

The present invention relates generally to teaching machines and more specifically to devices for displaying a question and indicating whether an answer given in response thereto is correct or incorrect.

Teaching machines, or as more commonly referred to, question and answer machines, have been well known in the art for many years. Generally these machines have been of two primary types; a multiple choice type machine and a composition answer type of machine. In the latter type of machine, a question is presented to a student who then writes out his answer which he thereafter compares with the correct answer given to him after he has completed composing his answer. This type of apparatus does not lend itself readily to mechanized marking procedures since the machine is not normally capable of comparing the content or meaning of two answers written in different forms. Consequently, a great deal of stress has been placed on the development of multiple choice machines which lend themselves readily to mechanized marking procedures. In a multiple choice type of machine, a question and multiple answers thereto are displayed either simultaneously or in sequence. It is then only necessary for the person being questioned to depress a key indicating the number designating the answer he considers to be correct. Thereafter the machine may readily determine whether the correct key was depressed and produce an indication of this determination.

In accordance with the present invention, there is provided a teaching machine of the composition type which lends itself to mechanical scoring techniques. In the apparatus of the invention a question to be answered is presented to a student which question is capable of being answered by one or a few words. The individual being tested spells out the word, letter-by-letter, and the apparatus checks each letter as it is presented to determine whether the individual letter is correct. If the letter is correct, the student is given an indication of such and is told to proceed with the presentation of the next letter. Thus the device operates sequentially and if the correct letters are presented in the proper order an indication of such is presented. If an incorrect letter is presented to the apparatus, this is indicated to the student and he may try other letters until he finally determines the correct one. Therefore, in order to be able to proceed with the spelling out of the answer he must first figure out the correct answer and therefore learns in the process.

It is thus seen that the apparatus of the present invention although being a composition type testing machine, presents the information in such a way that the machine may, by means of techniques normally employed in the multiple choice type of question apparatus, determine the content of the answer.

In accordance with the specific embodiment of the present invention, there is provided a strip projector on which the questions to be answered by a student are recorded. Each question is recorded on a number of frames of the film strip and specifically is recorded on a number of frames equal to the number of letters a word or words which spell out a correct answer. The strip film has associated with each frame a number of dark and light areas which are coded in accordance with a predetermined code to indicate a specific letter and these areas are associated with each of the frames of the film strips in such sequence that they provide a correct serial spelling of the word answer. The question portion of the strip is projected onto a viewing screen which is visible to the student while the coded indication is projected onto a group of photocells which detect the various patterns of dark and light areas. The pattern of dark and light area associated with the first frame of a new question indicates the first letter of the correct word response. The areas associated with the second frame indicates the second letter of the correct response and so on until all letters of the correct word or group of words are made available. A student upon viewing the first frame of a new question presses a set of keys to produce a coded designation corresponding to the correct letter answer and if this letter is correct, the machine advances the film strip one frame. If the second letter of the answer is correctly presented by the student then the strip is again advanced. In the event that the student presents an incorrect letter, the film strip is not advanced and thereby an indication is presented of an incorrect answer.

In one form of the invention, a group of five code locations or areas are provided on each film. The areas may be either light or dark and the pattern of light and dark areas are arranged in accordance with a conventional code such as the binary notation, so that the five areas may produce $2^n - 1$ or 31 different letter indications. The student is provided with five keys and he may depress any combination of these keys in order to produce voltage patterns designating various letters corresponding to the letters indicated by the coded locations on the film strip.

It is apparent that in such an apparatus the student must either first learn or have available a conversion table for the interrelationship between the keys to be depressed to express a specific letter. However, by utilizing conventional teletype techniques, a typewriter-like keyboard may be employed so that one key is provided for each letter of the alphabet or the numbers from zero to 9.

The apparatus of the present invention may be employed purely as a teaching machine, that is, a question is presented and the student attempts to provide a correct answer. The machine indicates when a correct answer is presented and by this method the student learns the required information. On the other hand, the apparatus may be employed as a testing device so that, if the student depresses an incorrect key, an indication indicative of an incorrect answer is recorded on a record sheet and thus the student may be marked in accordance with the number of correct or incorrect answers provided.

It is an object of the present invention to provide a teaching machine in which composition type answers are required and in which automatic marking techniques may be employed.

It is another object of the present invention to provide a teaching machine which requires composite type answers in which a student is required to spell out a correct answer, letter by letter, and the apparatus of the invention provides an indication of whether each such letter presented is correct.

It is yet another object of the present invention to provide a teaching machine in which a student is required to spell out a correct answer letter by letter, and in which each letter is checked in the order presented, against the correct letter for that particular order so as to provide an indication of whether the letter presented is correct or incorrect.

The above and still further objects, features and advantages of the present invention will become apparent upon consideration of the following detailed description of one specific embodiment thereof, especially when taken in conjunction with the accompanying drawings, wherein:

FIGURE 1 is a perspective view, partly diagrammatic, of the apparatus of the present invention;

FIGURE 2 is a longitudinal sectional view through the unit and showing diagrammatically in elevation certain elements;

FIGURE 3 is an illustration of the form of film strip employed in the apparatus;

FIGURE 6 is a largely diagrammatic showing of a step by step key operated control for a film advance means.

Figure 4:
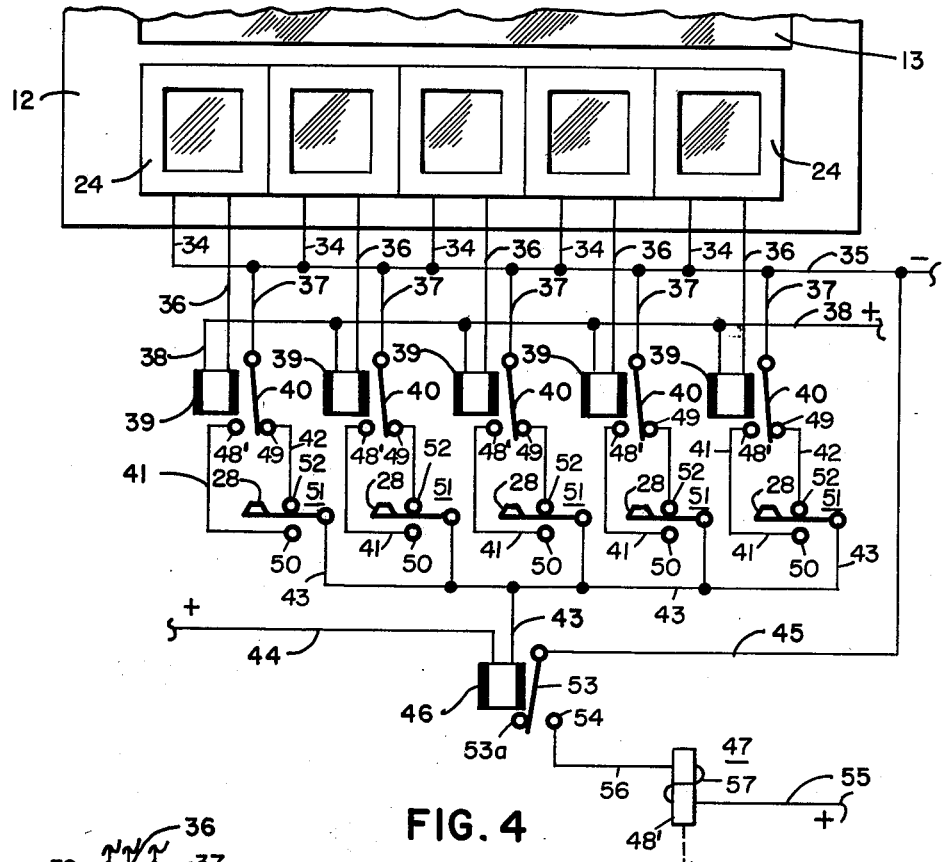
FIGURE 4 is a schematic electrical wiring diagram of the working circuits of the present invention.

Referring specifically to FIGURE 1 of the accompanying drawings, there is provided an enclosure 10 of a generally rectangular configuration having a hinged cover 11 hinged to the machine 10 at the rear edge thereof. The hinged cover 11 covers only a rearward portion of the machine which is co-extensive with a frame 12 secured by a hinge 14 at its forward edge to a panel 16. The frame 12 carries a viewing screen 13 adapted to have questions projected thereon by means of a film strip projector 15. The film strip projector 15 is located under the panel 16 which is hinged at 17 to a front horizontal panel 18. The panel 16 may be rotated upwardly and forwardly to provide ready access to the projector 15 for changing the film strips associated therewith.

The film strip projector 15 is provided with a supply reel 19, a take-up reel 21, and an optical projection system 22. In a conventional manner, in response to voltage developed in appropriate circuits, the feed mechanism of the projector 15 advances a film strip 20, frame by frame, so that each frame may be projected by the optical system 22 onto a mirror 23 disposed at a 45 degree angle with respect to the horizontal, under the frame 11. The viewing screen 13, mirror 23, and projector 15 are situated such that questions appearing on a portion of the film strip 20 are projected by the optical system 22 onto the viewing screen. A further portion of each frame of the strip 20 is projected onto a set of photo cells 24 secured to the hinged frame 12 below the viewing screen 13.

Referring now specifically to FIGURE 3 of the accompanying drawing, the film strip 20 comprises at each frame location, a region 26 having written questions thereon and a second region 27 disposed below the region 26 on which are recorded a pattern of five light and dark areas. It is the region 27 which is projected onto the photo cells 24 while the region 26 containing the written question is displayed on the screen 13.

Proceeding with the description of the apparatus of FIGURES 1 and 2, the closure 10 is further provided with a series of five keys 28 in the specific example under consideration which are mounted in the panel 18. These keys close electrical switches which are connected via a cable 29 to an enclosure 30 in which is disposed the various relay and electrical circuits illustrated in FIGURE 4 or FIGURE 5 of the accompanying drawing. The photo cells 24 are also connected by appropriate leads (not illustrated in FIGURE 2) to enclosure 30 while a film advance control in the enclosure 30 is connected via an appropriate coupling mechanism 31, to the film advance mechanism of the strip projector 15. To complete a description of the physical details of the enclosure 10, a pair of opaque side members 32 are connected to the edges of the frame member 12 so that when the member 12 is raised into the operating position, the side panels 32 prevent ambient light from entering the apparatus behind the viewing screen 13 and therefore permit one to obtain a reasonably bright display. When the apparatus is not in use, the frame member 12 may be lowered into the horizontal position and the cover 11 folded down thereover so as to provide a relatively dust-free enclosure and also an enclosure which is relatively compact. Referring now specifically to the FIGURE 4 of the accompanying drawings which illustrates a form of the circuits enclosed in the box 30, there is provided a negative voltage bus 35 and a positive voltage bus 38. The bus 35 is connected via a plurality of leads 34 to each of the photoelectric cells 24. The photo cells or if desired, photo resistive elements, each has a second terminal connected via a lead 36 to one side of a different winding of a set of relays 39. The other end of the windings of each of the relays 39 is connected to the positive voltage bus 38. The photoelectric devices 24 are of such a type that they present a high impedance in the absence of light and a low impedance in the presence of light so that if light is directed on to a particular photo cell 24, its associated relay 39 is energized. Each of the relays 39 is provided with an armature 40 connected via leads 37 to the negative voltage but 35. The movable armatures 40 are adapted to engage one of two contacts 48 or 49 depending upon the state of energization of the coil. Specifically, with a relay 39 de-energized, its associated armature 40 is biased to engage its associated contact 49. Conversely, if a relay 39 is energized, the armature 40 is biased to engage its associated contact 48.

Each contact 48 is connected via a distinct lead 41 to a stationary contact 50 of a single pole double throw switch 51 each having a second stationary contact 52 and a movable contact actuated by one of the keys 28. The stationary contacts 52 are connected via leads 42 to the contact 49 of the relay 39 and the movable contacts of the switches 51 are connected via a lead 43 to one end of a winding of a relay 46. The other end of the winding of the relay 46 is connected to a high voltage lead 44, which may be an extension of the positive bus 38. The relay 46 is provided with an armature 53 connected via a lead 45 to the negative voltage bus 35 and the armature engages an unconnected contact 53a when the relay 46 is energized as in FIG. 4. The armature 53 is adapted when the relay 46 is de-energized to engage a contact 54 connected via a lead 56 to a coil 57 of a solenoid 47. The solenoid 47 is provided with a movable armature 48 which is adapted to operate the film advance mechanism of the projector 15.

In operation, the armatures 40 of the relays 39 are normally in engagement with the contacts 49 and the armatures of the switches 51 are normally in engagement with their stationary contacts 52 all as illustrated in FIGURE 4. Upon the presentation of a question to the student, a pattern of light is projected onto the photo cells 24 in accordance with the code patterns 27 on the frame 26 of the film strip 20 presently being projected by the mechanism 15. Assuming a pattern such as that illustrated in the lower portion of FIGURE 3, all but the second from the left and the right-hand photo cells 24 are energized and present a low resistance to the circuit while the second from left and right-hand photo cells present a high resistance to the circuit. Consequently, the corresponding relays 39 associated with the three photo cells receiving light are energized and their armatures engage the stationary contacts 48. Thus voltage is removed from the stationary contacts 52 of all but the second from the left and the right-hand-most switches 51. This means that current supply to the relay 46 controlling line 43 is interrupted except at the two last mentioned switches 51.

The apparatus is thus arranged such that the letter indicated by the second from the left and right hand switches 51 requires for a correct answer that each of the related and correspondingly positioned keys 28 be depressed. In consequence of the depression of these keys 28, the lead 43 from supply line 44 through relay 46 is disconnected from the negative voltage bus 35 and the relay 46 is de-energized. The armature 53 of relay 46 now engages the contact 54 and an operating voltage is applied to the winding 57 of the solenoid 47 so that the film strip in the projector 15 is advanced one frame.

If an incorrect key 28 is depressed, or if any one or more of the keys 28 that should be depressed are not, then the lead 43 remains connected to the negative bus 35 and the relay 46 remains energized to retain its armature 53 in the position illustrated in FIG. 4, so that the solenoid 47 remains de-energized. This indicates an incorrect answer since under these circumstances, the film strip is not advanced.

Returning for the moment to operation of the switching mechanism, assume again the pattern of light and dark areas illustrated in the lower portion of FIGURE 3 is presented to the photo cells 24 and assume further that the left-hand most key associated with the switch 51 is depressed. Under these circumstances, a circuit is completed through the relay 46 in view of the negative voltage bus 35 connection with positive voltage bus 44 by way of lead 37, armature 40, contact 48, lead 41, contact 50, lead 43 and the coil of the relay 46. Thus, solenoid 47 remains de-energized and film 20 is not advanced.

Also if the key 28 associated with the right most cell 24 is depressed but that associated with the second from left photo cell is not depressed, voltage is still supplied to the relay 46 as the result of the negative voltage bus 35 connection with positive voltage bus 44 by way of the lead 37 to the second from left relay 39, armature 40, contact 49, lead 42, the contact 52 of the switch 51, lead 43 and the coil of relay 46. Thus if either an incorrect key 28 is depressed or a key which should have been depressed is not, the relay 46 remains energized and solenoid 47 de-energized. It is apparent, therefore, that in order for the student to provide correct answers, and therefore effect advance of the film strip, only the keys associated with non-illuminated photo cells 24 should be depressed.

In operation, when a question is presented to the student, a code pattern corresponding to the first letter of the correct word answer is simultaneously projected onto the photo cells 24. If the student depresses the correct array of keys 28, the solenoid 47 is energized and the film strip is advanced one frame. The same question is again presented to the student by the next frame, but the coded patterns projected onto the photo cells 24 now correspond to the second letter of the correct word answer. Successive frames following the first one will preferably display on the screen correct prior answer letters. This function continues until the entire correct answer is spelled, at which time a first frame of a next question group is presented. If at any time during the procedure of answering a question, an incorrect key or array of keys is depressed, the film strip does not advance and the student must determine the correct answer before the film is advanced another step. Thus the student may learn the required information by repeatedly attempting to form the required word or words.

Figure 5:
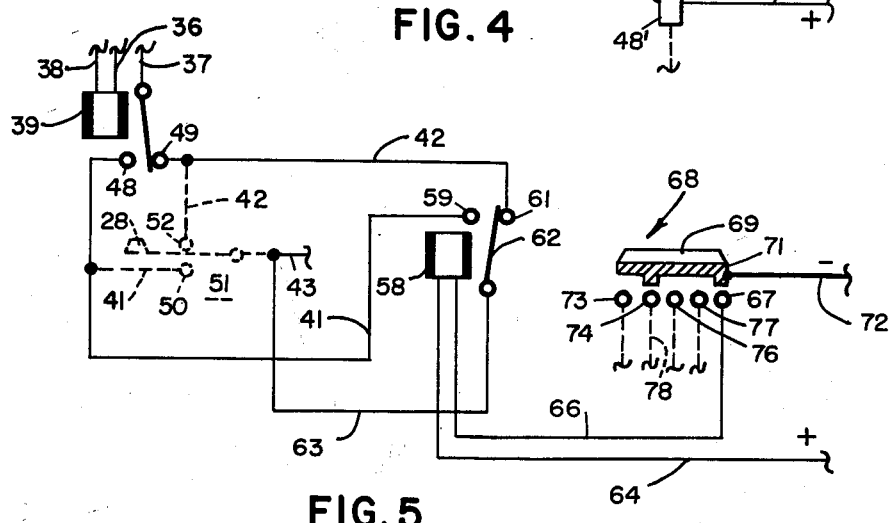
FIGURE 5 is an electrical schematic diagram of an alternative embodiment of the present invention.

Referring now specifically to FIGURE 5 of the accompanying drawings, there is illustrated an arrangement which may be employed with a teletype-like keyboard in which the individual being questioned need only press a single key having a symbol thereon designating the specific letter associated with each of these keys.

In the letter-display control arrangement of FIG. 5, each single-pole, double-throw switch 51 of FIG. 4 and its associated key 28 are replaced by a distinct single-pole, double-throw relay 58 having stationary contacts 59 and 61 and a movable contact 62, there thus being five such relays 58.

The contact 61 of relay 58 is connected via the lead 42 (the elements in FIGURE 5 corresponding to elements in FIGURE 4 carrying the same reference numerals) to the contact 49 and the stationary contact 59 is connected via lead 41 to the stationary contact 48. The movable contact 62 is connected via a lead 63 to the lead 43 which is connected to one end of the winding of the relay 46 as illustrated in FIGURE 4.

Each relay 58 has a winding, one end of which is connected via a lead 64 to a positive voltage terminal and the other end of which is connected via a lead 66 to a stationary contact of an appropriate double-pole switch 68. This double-pole switch 68 is actuated by any one of a plurality of keys, one for each pattern obtainable with five coded areas on the film 20, such a key being represented at 69.

Each key of the type of key 69 carries a movable contact 71 connected to a negative voltage lead 72. In the specific form of the apparatus illustrated in FIGURE 5, the switch 68 is provided with five stationary contacts designated by reference numerals 67, 73, 74, 76 and 77.

Assuming that the same pattern of light and dark areas are projected onto the photo cells 24, as illustrated in FIGURES 3 and 4, then it is necessary to energize the relays 58, associated with the second from left and the right hand photo cells 24. These relays are respectively connected to the stationary contacts 74 and 67, the latter connection being illustrated by the lead 66 in FIGURE 5, and the former connection being merely indicated by a lead 78 to another relay 58, not shown. Similarly, a relay is associated with each of the three remaining photo cells. The relays are respectively connected by leads to the remaining contacts 73, 76, and 77, in the same manner as illustrated by the relay 58, the lead 66, and the contact 67 in FIGURE 5. The illustrative key 69 is constructed for making contact between the movable contact 71 thereof and the stationary contacts 74 and 67 when the key is depressed. Upon depressing the key, the respective relays 58 corresponding to said second from left and right hand photo cells are energized, and their respective movable contacts 62 engage their stationary contacts 59. All of the other three relays 58 remain de-energized, with their movable contacts 62 engaging 61. The relays 39 associated with the second from left and right hand most cells 24 are de-energized and all other relays 39 are energized.

Upon energization of the proper relays 58, the circuit from the lead 37 to the lead 43 is opened and therefore no voltage is applied to the lead 43. Also, since all other relays 39 are energized, and the corresponding relays 58 are de-energized, the lead 43 does not receive a voltage from any of these circuits. Thus the relay 46 is de-energized and the contact 53 engages the contact 54 to energize the solenoid 47 and then actuate the film advance mechanism. An additional key of the type of key 69 is provided in the switch 68 for each other pattern of light and dark areas projected on the photo cells 24, and the keys contact appropriate switch stationary contacts among the contacts 67, 73, 74, 76, and 77, and energize appropriate relays 58, in similar manner to the foregoing. If an improper key is depressed, then a circuit is completed from at least one of the leads 37 to the lead 43 and the relay 46 is energized so that the film strip does not advance.

It is seen that the apparatus of the present invention may be employed either with a keyboard in which one or more keys must be depressed in the proper pattern corresponding to the pattern of light and dark area cast upon the photo cells 24 or a single key may be provided for each letter and in a response to the depression of the key, the appropriate relays 58 are energized to produce the same results as is produced when the appropriate combination of keys 28 is depressed in the embodiment of FIGURE 4.

As indicated earlier herein, the projector 15 will incorporate any preferred means for advancing the film 20 one frame at a time. In this connection, the projector 15 may be an ordinary commercial but slightly modified movie projector incorporating an induction type film drive motor (not shown).

One means for effecting the step by step (frame by frame) advancement of the film 20 is indicated in FIG. 6 wherein a shaft 81 of projector 15 driven by the usual and aforementioned projector contained induction type motor has any suitable operative connection with the projector-provided film advance means (not shown) so that the film 20 will be advanced one frame for each revolution of shaft 81. Or if the usual film advance means is eliminated or rendered inoperative, the shaft 81, or means driven thereby may have a direct drive connection with the marginal apertures of the film 20 itself.

Considering FIG. 6, the circuit of the induction type drive motor for the film advancing shaft 81 will remain closed throughout the time that the teaching machine of the present invention is in use. However, this type of motor will not be damaged by the periodic stopping of the armature shaft rotation by the presently to be described mechanical means which effects the frame by frame advance of the film 20.

Said means for limiting the rotation of the motor driven film advance shaft 81 to one revolution at a time under the control of the aforementioned solenoid 47 which, as stated, is operated by the circuits of FIG. 4, or by the FIG. 4 circuit modified as shown in FIG. 5 will now be described.

Still referring to FIG. 6, the film advancing and clockwise driven shaft 81 will preferably be the shaft that projects through a side wall 83a of the conventional movie film projector casing 15, and in such a projector carries a pulley that is part of a standard film re-wind mechanism. This shaft 81 is seen to have fast thereon the dog 82 whose upper end is aligned with one end of a superjacent rock lever 83 that has a depending dog-engaging stop lug to halt the clockwise rotation of shaft 81.

Rock lever 83 is pivoted intermediate its ends as at 84, to the exterior of a side wall of projector casing 15, or to some other suitable support. The second and 85a of rock lever 83 has the stiff link connection 85 with the core 48' of solenoid 47. Thus the brief energization of solenoid 47 by depression of proper keys 28 of FIG. 4 (or key 69 of FIG. 5) results in retraction of core 48' to rock lever 83 so as to free the film advance shaft 81 for clockwise movement. However, before the film advancing shaft 81 has made one revolution the key (or keys) 28 of FIG. 4 (or the key 69 of FIG. 5) will have been released to break the circuit of solenoid 47. This means that the spring (86) biased solenoid core 48' will be pushed out to actuate the rock lever 83 to shaft dog (82) intercepting position with its rear end engaging the stop 89. Stop 89, it may be mentioned, can be carried by the projector casing (15) side wall, or otherwise.

While I have described and illustrated one specific embodiment of my invention, it will be clear that variations of the details of construction which are specifically illustrated and described may be resorted to without departing from the true spirit and scope of the invention as defined in the appended claims.

I claim:

1. A teaching device employing a film strip having recorded thereon a plurality of frames of information, each of said frames including a question portion and an answer portion of coded discrete light transmitting areas, a group of frames equal in number to the number of characters required for the correct word answer to a question having the same question recorded thereon, each of said frames of said group having coded areas relating to a separate character of the word recorded thereon and the areas being arranged on said frames so that the characters are presented in the correct order to define the correct word answer, said teaching device comprising a viewing screen, a light detecting means, means for projecting one frame of the film at a time so that said question portion of the frame falls on said viewing screen and said answer portion falls on said light detecting means, said light detecting means producing a pattern of coded signals indicative of the coded light areas on said film, plural means operable together by the individual for producing coded patterns indicative of a letter of the word answer selected by the individual, means for producing a control signal in response only to exact correspondence between said coded patterns, means for sequencing said means for projecting so as to sequentially and successively present said frames to said viewing screen and said light detecting means and means for operating said means for sequencing in response to said control signal, and said means for projecting one frame at a time including constantly driven but brakeable motor driven film drive shaft, a dog fast on said shaft, a rock lever pivoted intermediate its ends to a support and having a dog-engaging stop at one end for maintaining said shaft stationary, means normally biasing said lever to dispose said stop in dog-engaging position; and the sequencing means for said projecting means including the core of a control signal-operated solenoid magnet which is operatively connected to said lever and movable to actuate said lever to dog-releasing position for the duration of operations of said individual operable means, the solenoid magnet being deenergized and said lever stop engaging said shaft dog to stop the shaft upon release of said individual operated means, whereby the film will be advanced one frame at a time.

2. A teaching device employing a film strip having recorded thereon a plurality of frames of information, each of said frames including a question portion and an answer portion of coded discrete light transmitting areas, a group of frames equal in number to the number of characters required for the correct word answer to a question having the same question recorded thereon, each of said frames of said group having coded areas relating to a separate character of the word recorded thereon and the areas being arranged on said frames so that the characters are presented in the correct order to define the correct word answer, said teaching device comprising a viewing screen, a light detecting means, means for projecting one frame of the film at a time so that said question portion of the frame falls on said viewing screen and said answer portion falls on said light detecting means, said light detecting means producing a pattern of coded signals indicative of the coded light areas on said film, plural means operable together by the individual for producing coded patterns indicative of a letter of the word answer selected by the individual, means for producing a control signal in response only to exact correspondence between said coded patterns, means for sequencing said means for projecting so as to sequentially and successively present said frames to said viewing screen and said light detecting means and means for operating said means for sequencing in response to said control signal; said light detecting means comprising a plurality of photoelectric means equal in number to the number of discrete light areas on each frame of the film, said projecting means projecting each discrete area on a different one of said photoelectric means; said means for operating said means for sequencing comprising a relay and including a first plurality of two position switches, a two-position switch each associated with a different one of said photoelectric means, a second plurality of two-position switches operable by the individual, means responsive to said coded patterns produced by said photoelectric means for positioning its associated switch in accordance with the signal output from said photoelectric means, each of said second plurality of switches operated by the individual assuming a different position from the remaining of said second plurality of switches, means connecting each switch from each of one said plurality of switches with one switch from the other said plurality of switches, in series across a source of supply, said series connected switches being connected in parallel across said source of supply, means connecting said relay in series with all of said series connected switches, said switches opening the circuit through said relay to operate said means for sequencing when the pattern of operated switches of said second plurality of switches represents the character presented to said photoelectric means and said switches closing the circuit through said relay to render inoperative said means for sequencing when the pattern of operated switches of said second plurality of switches fails to represent the character presented to said photoelectric means and said means for projecting one frame at a time including a constantly driven but brakeable motor driven film drive shaft, a dogfast on said shaft, a rock lever pivoted intermediate its ends to a support having a dog-engaging stop at one end for maintaining said shaft stationary, means normally biasing said lever to dispose said stop in dog-engaging position, said sequencing means for said projecting means including a shiftable core-incorporating solenoid magnet having a circuit which is closed by de-energization of said second relay, an operative connection between said magnet core and said lever and said magnet core operable to actuate said lever to dog-releasing position for the duration of de-energization of said second relay, whereby the lever dog will be returned to operative position to stop said film drive shaft by the time the film has been advanced the distance of one frame.

References Cited in the file of this patent
UNITED STATES PATENTS

| | | |
|---|---|---|
| Re. 23,030 | Holt | Aug. 24, 1948 |
| 2,482,242 | Brustman | Sept. 20, 1949 |
| 2,541,247 | Herr | Feb. 13, 1951 |
| 2,783,454 | North | Feb. 26, 1957 |
| 2,932,816 | Stiefel | Apr. 12, 1960 |